United States Patent
Hwang et al.

(10) Patent No.: US 9,454,598 B2
(45) Date of Patent: Sep. 27, 2016

(54) METHOD AND APPARATUS FOR MANAGING CONVERSATION MESSAGES

(71) Applicant: Samsung Electronics Co., Ltd., Gyeonggi-do (KR)

(72) Inventors: Sooji Hwang, Gyeonggi-do (KR); Yongjoon Jeon, Gyeonggi-do (KR); Piljoo Yoon, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 213 days.

(21) Appl. No.: 14/205,944

(22) Filed: Mar. 12, 2014

(65) Prior Publication Data

US 2014/0280288 A1    Sep. 18, 2014

(30) Foreign Application Priority Data

Mar. 13, 2013  (KR) .......................... 10-2013-0026963

(51) Int. Cl.
*G06F 17/30* (2006.01)
*H04M 1/725* (2006.01)
*G06Q 10/10* (2012.01)

(52) U.S. Cl.
CPC ... *G06F 17/30637* (2013.01); *G06F 17/30884* (2013.01); *G06Q 10/107* (2013.01); *H04M 1/72552* (2013.01)

(58) Field of Classification Search
CPC .................. G06F 17/30637; G06F 17/30884; H04M 1/72552; G06Q 10/107
USPC ........................................................ 707/766
See application file for complete search history.

(56) References Cited

U.S. PATENT DOCUMENTS

| | | | | |
|---|---|---|---|---|
| 5,872,521 A | * | 2/1999 | Lopatukin | G08B 5/227 340/7.52 |
| 6,473,621 B1 | * | 10/2002 | Heie | H04M 1/2472 340/7.31 |
| 6,693,652 B1 | * | 2/2004 | Barrus | G06F 3/0481 707/E17.009 |
| 7,412,437 B2 | * | 8/2008 | Moody | G06Q 10/107 |
| 7,421,153 B1 | * | 9/2008 | Ronca | G06Q 20/04 382/137 |
| 7,421,432 B1 | * | 9/2008 | Hoelzle | G06F 17/30637 |
| 7,689,465 B1 | * | 3/2010 | Shakes | G06Q 10/08 705/27.1 |
| 7,769,221 B1 | * | 8/2010 | Shakes | B07C 3/14 382/141 |

(Continued)

FOREIGN PATENT DOCUMENTS

| | | | | |
|---|---|---|---|---|
| EP | 1 536 350 A2 | 6/2005 | | |
| GB | 2420039 A | * | 5/2006 | ............ H04L 12/583 |

(Continued)

OTHER PUBLICATIONS

Help Me Make Mustard That Doesn't Scorch My Nose, Mar. 21, 2011, pp. 1-3, http://www.marksdailyapple.com/forum/thread26291.html.

*Primary Examiner* — Phuong Thao Cao
(74) *Attorney, Agent, or Firm* — Cha & Reiter, LLC.

(57) ABSTRACT

A method for managing messages is provided, including: displaying, by a first terminal, a conversation screen associated with a plurality of messages; displaying an indication that there is a link query corresponding to a first message; detecting whether the indication is selected; responsive to the indication being selected, performing a first search of the plurality of messages for the first message, the first search being performed based on a first search key that is generated using the link query; and displaying the first message when the first search is successful.

18 Claims, 9 Drawing Sheets

(56) References Cited

U.S. PATENT DOCUMENTS

| | | | | |
|---|---|---|---|---|
| 8,332,477 B1* | 12/2012 | Kaiserlian | ............... | H04L 51/16 709/206 |
| 8,533,055 B1* | 9/2013 | Brazil | .................... | G06Q 30/00 705/26.1 |
| 9,143,468 B1* | 9/2015 | Cohen | .................... | H04L 51/00 |
| 2002/0188603 A1* | 12/2002 | Baird | ................ | G06F 17/30637 |
| 2003/0051003 A1* | 3/2003 | Clark | .................... | G06Q 10/10 709/218 |
| 2003/0126090 A1* | 7/2003 | Fukuoka | ................ | G06Q 10/10 705/54 |
| 2005/0060656 A1* | 3/2005 | Martinez | ............ | H04L 12/1827 715/751 |
| 2005/0222985 A1* | 10/2005 | Buchheit | ............. | G06Q 10/107 |
| 2005/0223057 A1* | 10/2005 | Buchheit | ............. | G06Q 10/107 709/203 |
| 2005/0223066 A1 | 10/2005 | Buchheit et al. | | |
| 2005/0289220 A1* | 12/2005 | Chen | .................. | H04L 12/1827 709/206 |
| 2006/0053204 A1* | 3/2006 | Sundararajan | .......... | H04L 51/16 709/206 |
| 2006/0123347 A1* | 6/2006 | Hewitt | .................. | G06F 9/4443 715/748 |
| 2006/0161852 A1* | 7/2006 | Chen | .................. | H04L 12/1831 715/758 |
| 2006/0167993 A1* | 7/2006 | Aaron | .................. | H04L 12/581 709/204 |
| 2006/0195506 A1* | 8/2006 | Deng | .................. | H04L 51/066 709/203 |
| 2006/0251106 A1* | 11/2006 | Nakagawa | ............. | H04L 45/04 370/456 |
| 2007/0036286 A1* | 2/2007 | Champlin | ........... | H04L 12/5835 379/67.1 |
| 2008/0037721 A1* | 2/2008 | Yao | ...................... | G06Q 10/107 379/88.11 |
| 2008/0075241 A1* | 3/2008 | Kent | ...................... | H04M 1/57 379/88.12 |
| 2008/0168146 A1 | 7/2008 | Fletcher | | |
| 2008/0220748 A1* | 9/2008 | Park | .................. | H04M 1/72547 455/414.1 |
| 2008/0256194 A1* | 10/2008 | Girouard | ............. | G06Q 10/107 709/206 |
| 2010/0223542 A1 | 9/2010 | Vuong et al. | | |
| 2011/0134302 A1* | 6/2011 | Wu | ...................... | G06F 1/1639 348/333.02 |
| 2011/0213845 A1* | 9/2011 | Logan | .................... | H04L 51/18 709/206 |
| 2012/0173633 A1* | 7/2012 | Balabhadrapatruni | .................... | G06Q 10/107 709/206 |
| 2012/0278168 A1* | 11/2012 | O'Hara | .................. | G06Q 30/02 705/14.53 |
| 2012/0284093 A1* | 11/2012 | Evans | .................. | G06Q 10/107 705/14.1 |
| 2012/0303445 A1* | 11/2012 | Jablokov | ................ | G06Q 30/02 705/14.42 |
| 2013/0125019 A1* | 5/2013 | Vymenets | ............... | G06F 17/21 715/752 |
| 2014/0280288 A1* | 9/2014 | Hwang | ............. | G06F 17/30637 707/766 |
| 2015/0169208 A1* | 6/2015 | Cho | .................... | H04L 12/1827 715/752 |

FOREIGN PATENT DOCUMENTS

| | | |
|---|---|---|
| KR | 10-2009-0072144 A | 7/2009 |
| KR | 10-2011-0086233 A | 7/2011 |
| KR | 10-2011-0096090 A | 8/2011 |

* cited by examiner

METHOD AND APPARATUS FOR MANAGING CONVERSATION MESSAGES

CLAIM OF PRIORITY

This application claims the benefit under 35 U.S.C. §119 (a) of a Korean patent application filed on Mar. 13, 2013 in the Korean Intellectual Property Office and assigned Serial No. 10-2013-0026963, the entire disclosure of which is hereby incorporated by reference.

TECHNICAL FIELD

The present disclosure relates to telecommunications, and more particularly to a method and apparatus for managing conversation messages.

BACKGROUND

A mobile terminal provides various functions required by users. For example, a mobile terminal provides various functions, such as a call function, a still image or moving image capture function, a broadcast reception function, and an Internet access function. Such a mobile terminal provides a message function for exchanging messages with one or more other users. Recent mobile terminals display the transmitted and received messages in the form of a user interface having a conversation form.

In some instances, the number of messages from a given conversation that can be displayed at the same time may be limited by the screen's size. For example, only several messages from the conversation may be displayed at the same time. Thus, to view other messages from the conversation, a user may need to scroll the screen. However, scrolling the screen may be inconvenient. Moreover, as the number of messages in a conversation increases, scrolling the messages becomes more difficult.

Accordingly, the need exists for new techniques for finding conversation messages.

SUMMARY

The present disclosure may provide a method and apparatus for managing conversation messages in a mobile terminal, wherein a link query corresponding to a specific conversation message is generated and stored, and the specific conversation message can be easily searched for using the stored link query.

This disclosure may provide a method and apparatus for managing conversation messages in a mobile terminal, wherein a link query can be shared with another user (e.g., a conversation partner).

According to one aspect of the disclosure, a method for managing messages is provided, comprising: displaying, by a first terminal, a conversation screen associated with a plurality of messages; displaying an indication that there is a link query corresponding to a first message; detecting whether the indication is selected; responsive to the indication being selected, performing a first search of the plurality of messages for the first message, the first search being performed based on a first search key that is generated using the link query; and displaying the first message when the first search is successful.

According to another aspect of the disclosure, an apparatus is provided comprising: a display screen; and a processing circuitry configured to: display, on the display screen, a conversation screen associated with a plurality of messages; display, on the display screen, an indication that there is a link query corresponding to a first message; detect whether the indication is selected; responsive to the indication being selected, perform a first search of the plurality of messages for the first message, the first search being performed based on a first search key that is generated using the link query; and display, on the display screen, the first message when the first search is successful.

DETAILED DESCRIPTION

Hereinafter, aspects of this disclosure are described in detail with reference to the accompanying drawings. It is to be noted that the same reference numbers are used throughout the drawings to refer to the same elements. Furthermore, a detailed description of known functions or constructions may be omitted to avoid obscuring subject matter that is considered more pertinent.

Meanwhile, the examples disclosed in the present specification and drawings are illustrated to present only specific examples in order to clarify the technical contents of this disclosure and to help understanding of this disclosure, but are not intended to limit the scope of this disclosure. It will be evident to those skilled in the art that various implementations based on the technical spirit of this disclosure are possible in addition to the disclosed aspects.

According to aspects of the disclosure, a mobile terminal any device capable of providing a message transmission/reception function, and can be a mobile communication terminal, a smart phone, a tablet Personal Computer (PC), a handheld PC, a Portable Multimedia Player (PMP), a Personal Digital Assistant (PDA), or a notebook PC. Although various examples in the disclosure are provided in the context of mobile terminals, it is to be understood that the present disclosure is not limited to mobile terminals and any of the techniques and methods described herein may be implemented using any type of computing device (e.g. a desktop computer, a gaming console, etc.).

According to aspects of the disclosure, the term 'link query' refer to a message transmitted to and received from a counterpart that is linked. In other words, the link query may perform a function of providing a shortcut to a specific conversation message. To this end, the link query can indicate one or more of a conversation date, a keyword (i.e.

part or all of the conversation contents or a part or the entire specific conversation message), an author of the specific conversation message, a conversation session ID, and a conversation message ID. Supplementary information (i.e., a captured image of a screen on which a specific conversation message is displayed) and information about the person who generated the link query can be mapped to the link query. That is, when the link query is generated and stored, the link query can be stored along with the supplementary information and the information about the person who generated the link query.

The disclosure is not limited to any specific messaging protocol. The disclosure can be applied to Short Message Service (SMS), Multimedia Message Service (MMS), e-mail, and unified messenger service, in which transmitted and received messages are displayed in the form of a User Interface (UI) having a conversation form, and/or any other suitable protocol.

Figure 1:
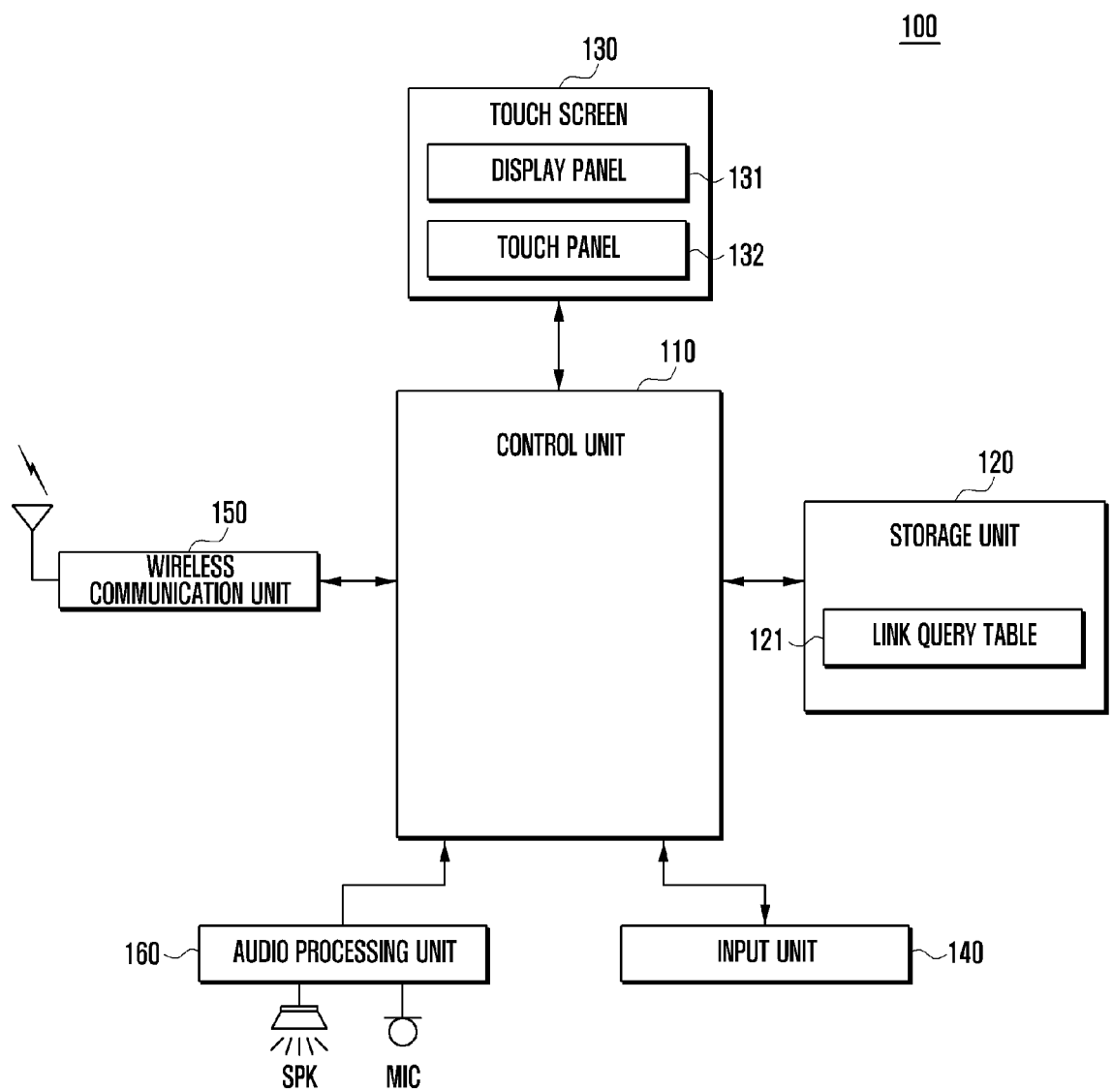
FIG. 1 is a block diagram of a mobile terminal in accordance with an aspect of this disclosure.

FIG. 1 is a block diagram of a mobile terminal in accordance with an aspect of this disclosure.

Referring to FIG. 1, the mobile terminal 100 in accordance with an aspect of this disclosure can include a control unit 110, a storage unit 120, a touch screen 130, an input unit 140, a wireless communication unit 150, and an audio processing unit 160. The touch screen 130 can include a display panel 131 and a touch panel 132, and the storage unit 120 can include a link query table 121.

In operation, according to some aspects of the disclosure, the mobile terminal 100 can generate a link query for performing a shortcut function on a specific one of a plurality of conversation messages and store some or all of the generated link queries. The mobile terminal 100 may support a function that enables a user to easily check previous conversation messages through some or all of the generated link queries. Here, if only some of the link queries are stored, the mobile terminal 100 can generate a query with which conversation messages can be searched for using the stored link queries and search for previous conversation messages using the generated query. Furthermore, the mobile terminal 100 can support a function for sharing the link queries with conversation partners. Each of the elements of the mobile terminal 100 for supporting the functions is described in detail below.

The audio processing unit 160 can be connected to a speaker SPK for outputting audio signals that are transmitted and received during a conversation, an audio signal included in a received message, an audio signal generated when an audio file stored in the storage unit 120 is played, and a microphone MIC for gathering a user's voice or other audio signals. The audio processing unit 160 can output a sound effect that announces the transmission and reception of conversation messages, a sound effect that announces the selection of a conversation message, a sound effect announcing that a conversation message corresponding to a selected link query has been displayed on a screen, a sound effect announcing that the conversation screen is moving, a sound effect announcing that a generated link query has been fully stored, a sound effect announcing that a link query has been fully transmitted, and a sound effect announcing that a message including a link query has been received through the speaker SPK under the control of the control unit 110.

The wireless communication unit 150 supports the wireless communication function of the mobile terminal 100 and can include a mobile communication module if the mobile terminal 100 supports a mobile communication (e.g., mobile communication in accordance with the 3G or 4G standard) function. The wireless communication unit 150 can include a Radio Frequency (RF) transmitter (not shown) for performing up-conversion and amplification on the frequency of the transmitted signal and an RF receiver (not shown) for performing low-noise amplification on a received signal and performing down-conversion on the frequency of the amplified signal. In particular, the wireless communication unit 150 in accordance with aspects of disclosure can transmit and receive instant messages. Furthermore, the wireless communication unit 150 can send a link message, including a link query, to at least one counterpart's terminal. Furthermore, the wireless communication unit 150 can send a captured image of a conversation message, corresponding to a link query, to a counterpart's terminal. In some implementations, the captured image may include any non-textual representation of the conversation message, such as a JPG image. Additionally or alternatively, in some implementations, the captured image may include any representation of the conversation message that is different from the representations that are used to store the conversation messages on the mobile terminal 100.

The input unit 140 can include a plurality of enter keys and function keys for receiving numerical or alphabetic information and setting various functions. The function keys can include direction keys, side keys, and shortcut keys, which are configured to perform specific functions. Furthermore, the input unit 140 generates key signals related to user setting and control of the functions of the mobile terminal 100 and transfers the key signals to the control unit 110. The input unit 140 can be formed of any one of input means, such as a QWERTY keypad, a 3*4 keypad, a 4*3 keypad, a ball joystick, an optical joystick, a wheel key, a touch key, a touch pad, and a touch screen, or a combination of them. Meanwhile, if the mobile terminal 100 supports a full-touch screen, the input unit 140 may include only some of function keys, such as a volume key, a power key, a menu key, a cancel key, and a home key. In particular, the input unit 140 in accordance with this disclosure can generate an input signal for controlling a procedure for generating a link query, an input signal for controlling the execution of a generated link query, and an input signal for controlling a procedure for sharing a link query, and can send the input signals to the control unit 110.

The touch screen 130 can perform an input function and a display function. To this end, the touch screen 130 can include the display panel 131 and the touch panel 132.

The display panel 131 displays information inputted by a user or information to be provided to a user in addition to various menus for the mobile terminal 100. The display panel 131 can be formed of a liquid crystal display, Organic Light Emitted Diodes (OLEDs), or Active Matrix Organic Light Emitted Diodes (AMOLEDs). The display panel 131 can provide a variety of screens generated when the mobile terminal 100 is used, for example, a home screen, a menu screen, a web page screen, and a call screen. In particular, the display panel 131 in accordance with an aspect of this disclosure can display a conversation screen on which transmitted and received conversation messages are displayed using speech bubbles. Furthermore, the display panel 131 can display a screen for controlling the generation of a link query corresponding to a specific conversation message, a screen for controlling the execution of the generated link query, and a screen for controlling the sharing of the link query. The display panel 131 will be described in detail later with reference to FIGS. 3, 5, and 7.

The touch panel 132 may include a device for providing an input function. The touch panel 132 can generate a touch event when a touch input device, for example, a finger of a user, a stylus, or an electronic pen, touches or approaches the touch panel 132, and can transfer the generated touch event to the control unit 110. Particularly, the touch panel 132 can recognize the generation of a touch event based on a change in physical quantity (e.g., electrostatic capacity or a resistance value) that is attributable to the contact or proximity of a touch input device, and can transfer the type (e.g., a tap, a touch & movement [drag or flick], a long touch, a double touch, or a multi-touch) of generated touch event and information about the position of the touch to the control unit 110. The touch panel 132 is readily understood by a person having ordinary skill in the art to which this disclosure pertains, and thus a detailed description thereof is omitted. In particular, the touch panel 132 in accordance with this disclosure can generate touch signals for controlling the management of conversation messages, for example, a touch signal for controlling the generation of a link query, a touch signal for controlling the execution of a generated link query, and a touch signal for controlling the sharing of a link query corresponding to a specific conversation message, and can send the generated touch signals to the control unit 110.

The storage unit 120 may include any suitable type of volatile and/or non-volatile memory, such as a Solid State Drive (SSD), Random Access Memory (RAM), Read-Only Memory (ROM), a hard Drive, a CD-ROM, etc. In operation, the storage unit 120 can store applications necessary for other optional functions, for example, a sound playback function, a still image display or moving image playback function, a broadcast playback function, an Internet access function, and a text message function, in addition to the Operating System (OS) of the mobile terminal 100. Furthermore, the storage unit 120 can store various data, for example, video files, game files, music files, and movie files. In particular, the storage unit 120 in accordance with this disclosure can store conversation messages. Furthermore, the storage unit 120 can store the link query table 121, such as Table 1 below.

conversation message. The link query can be generated based on one or more of the date when a conversation message was generated, the body (some or all of the body), and a message writer. In some implementations, the identity of the person who generated the link query can be stored in the form of a telephone number. The supplementary information can include a captured image of a conversation message for which a link query has been generated or a captured image of a conversation screen on which a conversation message for which a link query has been generated is displayed. The supplementary information is provided when a conversation message corresponding to a link query is deleted. The storage unit 120 can store a captured image in the supplementary information region of the link query table 121. In another aspect, the storage unit 120 may store a captured image in an additional space and store information about the place where the captured image is stored in the supplementary information region. Meanwhile, Table 1 is only an example, and it will be evident to those skilled in the art that this disclosure is not limited to Table 1.

The control unit 110 may include any suitable type processing circuitry, such as a processor (e.g., an ARM-based processor, a MIPS-based processor, an X86 processor) a Field-Programmable Gate Array (FPGA), or an Application Specific Integrated Circuit (ASIC), for example. In operation, the control unit 110 can control the overall operation of the mobile terminal 100 and the flow of signals between the internal blocks of the mobile terminal 100, and can perform a data processing function. In some implementations, the control unit 110 can be formed of a single core processor or a multi-core processor.

The control unit 110 can control a procedure for generating a link query. Particularly, the control unit 110 can generate a link query using at least one of a date, contents of the body, and a message writer when a request to generate the link query corresponding to a specific conversation message is entered in a conversation screen, and can store the generated link query in a table form. For example, the

TABLE 1

| CONVERSATION SESSION ID | CONVERSATION MESSAGE ID | LINK QUERY | PERSON WHO GENERATED LINK QUERY | SUPPLEMENTARY INFORMATION (CAPTURED IMAGE) |
|---|---|---|---|---|
| 100 | 101 | [2012/06/25]4 pm OK??? Save it | 010-1111-222 | c:And/capcaptured_image_of_message_1.jpg |
| 105 | 1001 | [2012/01/01] | 011-3333-4444 | |
| 200 | 201 | digital city | 016-5555-6666 | c:And/cap/captured_image_of_message_2..jpg |
| . | . | . | . | . |
| . | . | . | . | . |
| . | . | . | . | . |

Referring to Table 1, the link query table 121 can include a conversation session ID, a conversation message ID, a link query, the person who generated the link query, and supplementary information. The conversation session ID is ID information for classifying conversation screens (windows) through which a conversation is held with at least one conversation partner. The conversation message ID is ID information for classifying conversation messages included in the conversation screen. The link query is a query to which a specific conversation message is linked. That is, the link query can perform a shortcut function on a specific control unit 110 can store the link query in a table form, such as Table 1. Here, the control unit 110 can capture an image of a screen on which a selected specific conversation message is displayed, store the captured image as supplementary information, and store the telephone number of a user as information about the person who generated the link query.

When a link query view menu is selected, the control unit 110 can control the display panel 131 so that previously stored link queries are output in the form of a list. For example, the list includes at least one indication that there is at least one link query corresponding to at least one conversation message. When a specific link query (or the indication that there is a specific link query) is selected (e.g., touched) in the list, the control unit 110 can control the display panel 131 so that a conversation message corresponding to the selected link query (hereinafter referred to as a 'query message') is output. Particularly, the control unit 110 can scroll a conversation screen so that the query message is placed at the top of the conversation screen. Here, the control unit 110 can control the display panel 131 so that a screen scroll effect, in which the conversation screen is visually scrolled, is provided. The control unit 110 can control the display panel 131 so that the query message is highlighted. Meanwhile, if the query message is not present, that is, if the query message has been deleted, the control unit 110 can check whether a captured image is present or not. If, as a result of the check, a captured image is found to be present, the control unit 110 can control the display panel 131 so that the captured image is displayed. If, as a result of the check, no captured image is found to be present, the control unit 110 can control the display panel 131 so that an error message announcing that the query message has been deleted is output.

The control unit 110 can control a procedure for sharing a link query corresponding to a specific conversation message. Particularly, when a request to share a specific conversation message is received, the control unit 110 can generate a link query corresponding to the specific conversation message and store the link query. Next, the control unit 110 can send the generated link query to at least one conversation partner. When generating a link query corresponding to a conversation message to be shared, the control unit 110 may also capture an image of the specific conversation message that corresponds to the link query that is being generated. The captured image can be transmitted to the conversation partner when the link query is transmitted, or can be transmitted when a request to send the captured image is received from the mobile terminal of the conversation partner.

Meanwhile, when a conversation message including a link query (i.e., a link message) is received from the mobile terminal of a conversation partner, the control unit 110 can parse the message and display the parsed message on a conversation screen. In some implementations, the control unit 110 can highlight the parsed message. For example, the control unit 110 can display the parsed message in a different letter color, letter size, font, etc. in order to indicate that the parsed message is a message including a link query, rather than a common conversation message, or can change the letter attributes of the parsed message, such as whether it is underlined, bold, or in italics, and display the changed letter attributes. When the received link query is selected (e.g., touched), the control unit 110 can search for a conversation message corresponding to the received link query (i.e., a query message). If, as a result of the search, a query message is found to be present, the control unit 110 can move the conversation screen to the position where the query message is displayed. In contrast, if, as a result of the search, no query message is found to be present, the control unit 110 can request the mobile terminal of the conversation partner to send a captured image. In another aspect, the control unit 110 can check whether or not the received link message includes a captured image. If, as a result of the check, the received link message does not include a captured image, the control unit 110 may request the mobile terminal of the conversation partner to send the captured image.

When deleting a conversation screen (or window), the control unit 110 can delete all link queries related to the conversation screen (or window). In particular, the control unit 110 can check a conversation session ID of the conversation screen (or window) and delete link queries having the checked conversation session ID from the link query table 121.

The disclosure is not limited to an example in which a specific conversation message is selected in a conversation screen and a request is made to share the specific conversation message with a conversation partner. For example, in another aspect of this disclosure, at least one of link query that has been previously generated and stored may be selected and shared with a conversation partner.

Although not shown in FIG. 1, the mobile terminal 100 can further selectively include elements having supplementary functions, such as a Global Positioning System (GPS) module for receiving position information, a broadcast reception module for receiving broadcasts, a digital sound source playback module, such as an MP3 module, and an Internet communication module (e.g., a Wi-Fi communication module) for performing an Internet access function.

Figure 2:
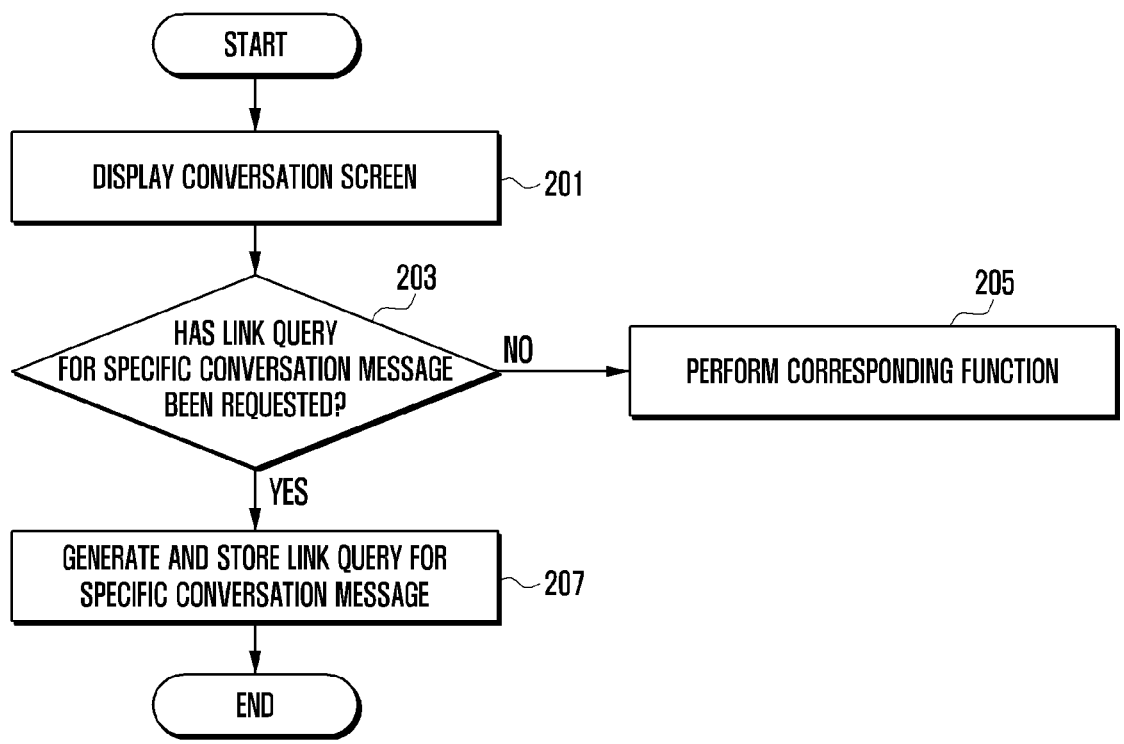
FIG. 2 is a flowchart illustrating a method of generating a link query in accordance with an aspect of this disclosure.
Figure 3:
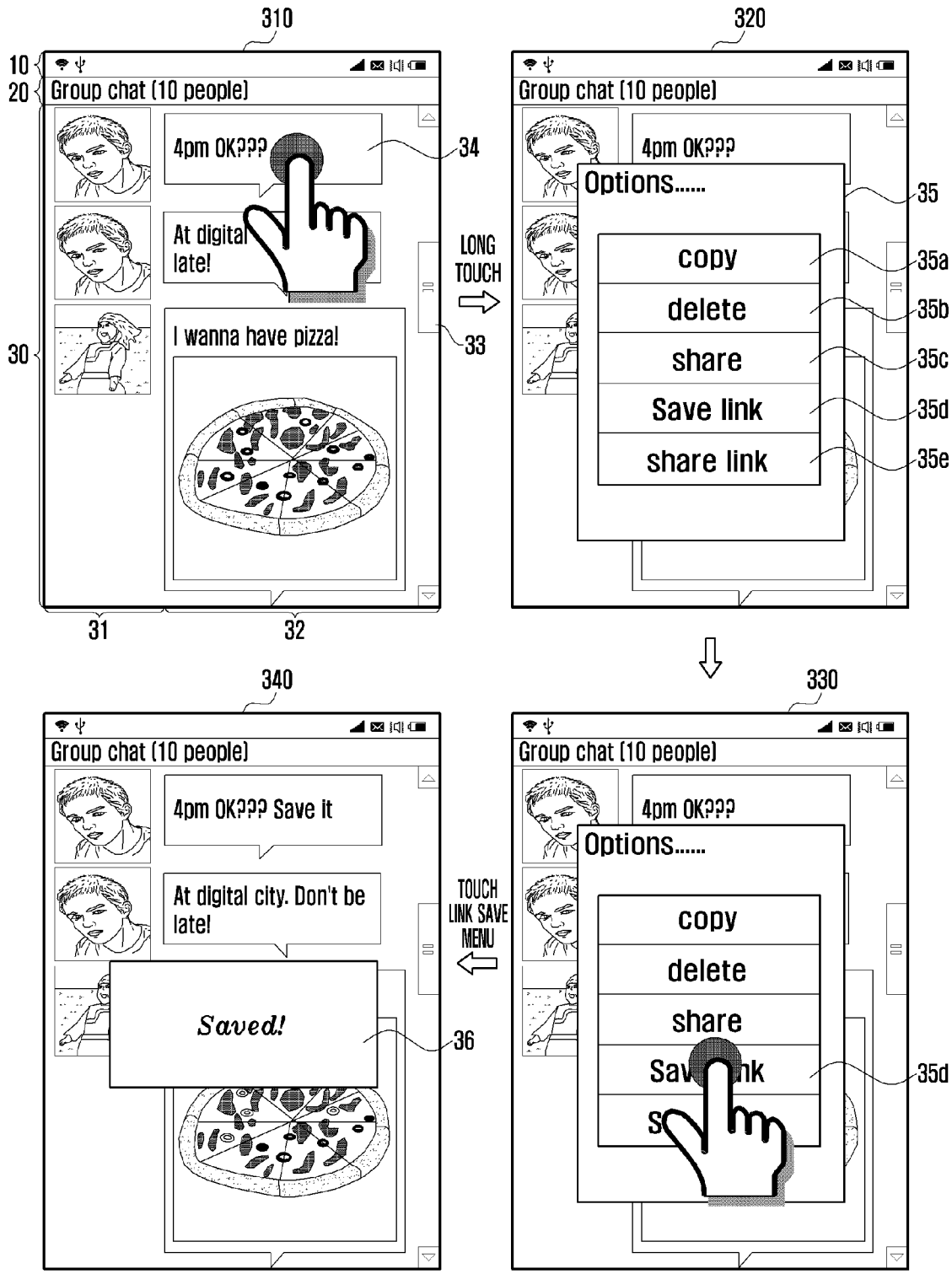
FIG. 3 is a screen diagram illustrating the method of generating a link query in accordance with an aspect of this disclosure.

FIG. 2 is a flowchart illustrating a method of generating a link query in accordance with an aspect of this disclosure, and FIG. 3 is a diagram of a screen illustrating the method of generating a link query in accordance with an aspect of this disclosure.

Referring to FIGS. 2 and 3, the control unit 110 in accordance with an aspect of this disclosure can control the display panel 131 so that a conversation screen through which messages are transmitted to and received from at least one conversation partner is displayed at operation 201. For example, the control unit 110 can control the display panel 131 so that a conversation screen, such as the screen 310 shown in FIG. 3, is output. Referring to the screen 310, the conversation screen can include an indicator region 10, a title region 20, and a conversation region 30. The indicator region 10 provides information, such as the strength of a radio signal, the amount of remaining battery power, the reception of a text message, and whether a Wi-Fi function is enabled or disabled. The title region 20 displays the title of a currently displayed conversation screen (or window) and information about members. For example, the title region 20 of the screen 310 shows that the user of the mobile terminal 100 is engaged in a group chat with 10 conversation partners.

The conversation region 30 can include an ID information display region 31 in which information about the IDs of a user and conversation partners are displayed and a conversation message display region 32 in which conversation messages entered by a user and conversation partners are displayed in a speech bubble form. Although information about the IDs of a user and conversation partners has been illustrated as being displayed in an image form in FIG. 3, the information about the IDs of the user and conversation partners may be displayed in text form. In another aspect, both images and text corresponding to the information about the IDs of the user and conversation partners may be displayed. A scroll bar 33 can be displayed at the right edge of the conversation region 30. The scroll bar 33 may be used to indicate the current position of the messages that are displayed in the overall conversation screen. This scroll bar 33 can be constantly displayed on the conversation screen. In another aspect, the scroll bar 33 may be temporarily displayed only when the conversation screen moves, and may disappear after a lapse of sometime after the movement of the screen is stopped.

The control unit 110 can check whether or not a link query generation request for a specific conversation message 34 has been made at operation 203. If, as a result of the check, it is determined that a link query generation request has not been made, the control unit 110 can proceed to operation 205 and perform a corresponding function. For example, the control unit 110 can send a conversation message, entered by a user, to counterpart terminals, and display the entered conversation message in the conversation region 30. As another example, the control unit 110 can display a conversation message, received from a counterpart's terminal, in the conversation region 30.

If, however, it is determined that a link query generation request has been generated, the control unit 110 can proceed to operation 207, in which the control unit 110 generates a link query corresponding to the specific conversation message 34 and stores the generated link query. For example, a user can long touch the specific conversation message 34 for which a link query will be generated, as in the screen 310. In response to the long touch, the control unit 110 can output a menu pop-up window 35, including a plurality of option menus 35a, 35b, 35c, 35d, and 35e, as shown in a screen 320. The menu pop-up window 35 can include the copy menu 35a for copying the selected specific conversation message 34 in memory, the delete menu 35b for deleting the selected specific conversation message 34, the share menu 35c for sharing the selected specific conversation message 34, the link save menu 35d for generating a link query corresponding to the selected specific conversation message 34, and the link share menu 35e for sharing the link query of the selected specific conversation message 34. Thereafter, in order to generate a link query corresponding to the selected specific conversation message 34, the user can touch the link save menu 35d of the menu pop-up window 35, as shown in a screen 330. When the touch on the link save menu 35d is detected, the control unit 110 can generate a link query corresponding to the selected specific conversation message 34 and store the generated link query, as shown in the screen 340. Next, the control unit 110 can control the display panel 131 so that a save completion pop-up window 36, announcing that the generated link query has been stored, is displayed.

Although not shown in FIG. 2, when generating the link query, the control unit 110 can store a captured image of a conversation screen on which the selected specific conversation message 34 is displayed. The stored captured image can be used if the selected specific conversation message 34 has been deleted. In this case, in accordance with this disclosure, even if an important conversation message generated by a user, that is, a link query, is deleted by mistake, the important conversation message can be checked through the stored captured image. Furthermore, in accordance with this disclosure, when sharing a link query, even if a conversation partner has deleted a corresponding conversation message, the conversation partner can be reminded of the contents of the conversation message by sending the stored captured image to the conversation partner. As noted above, the image may be referenced in the link query table 121.

Figure 4:
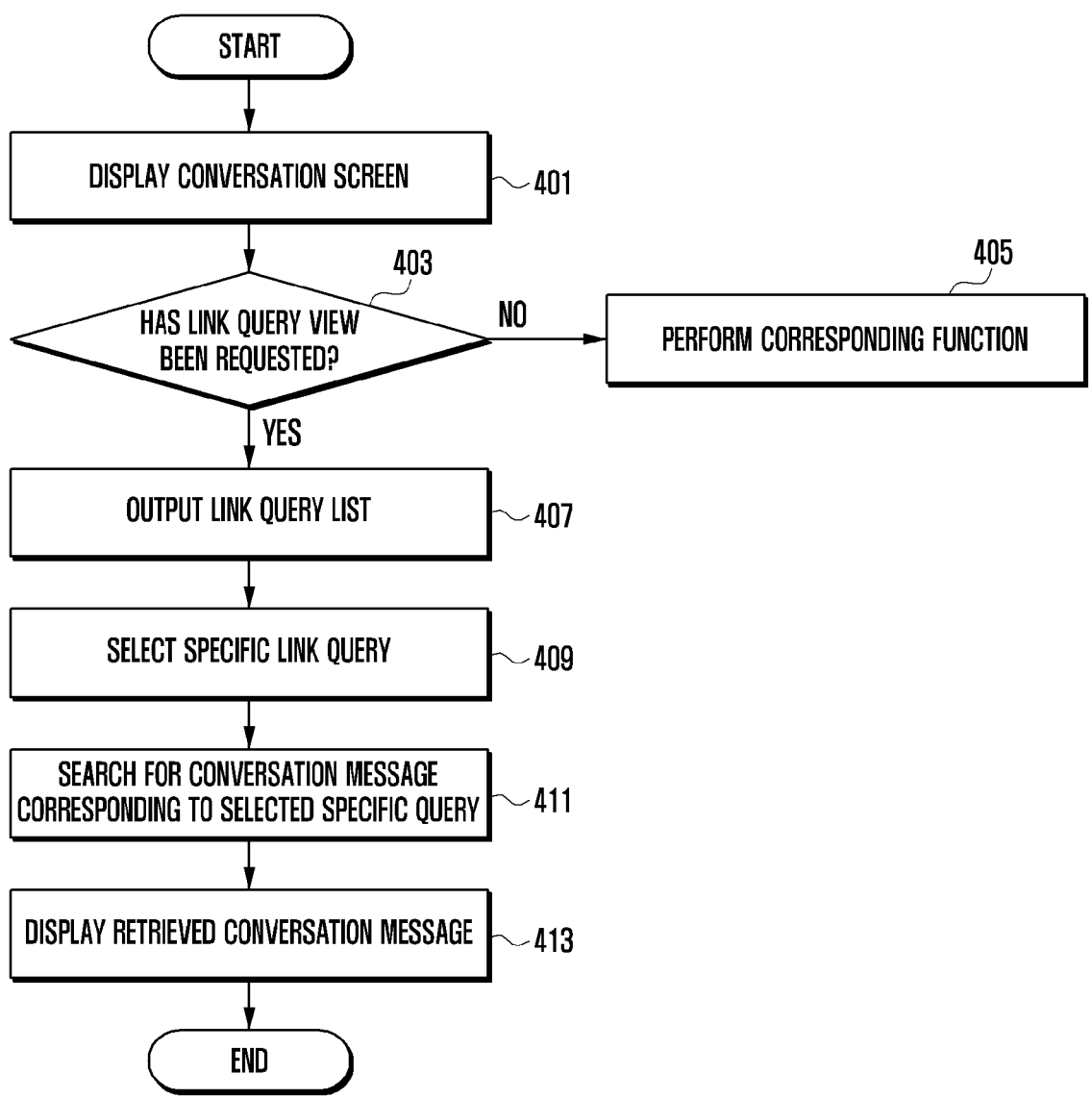
FIG. 4 is a flowchart illustrating a method of executing a generated link query in accordance with an aspect of this disclosure.
Figure 5:
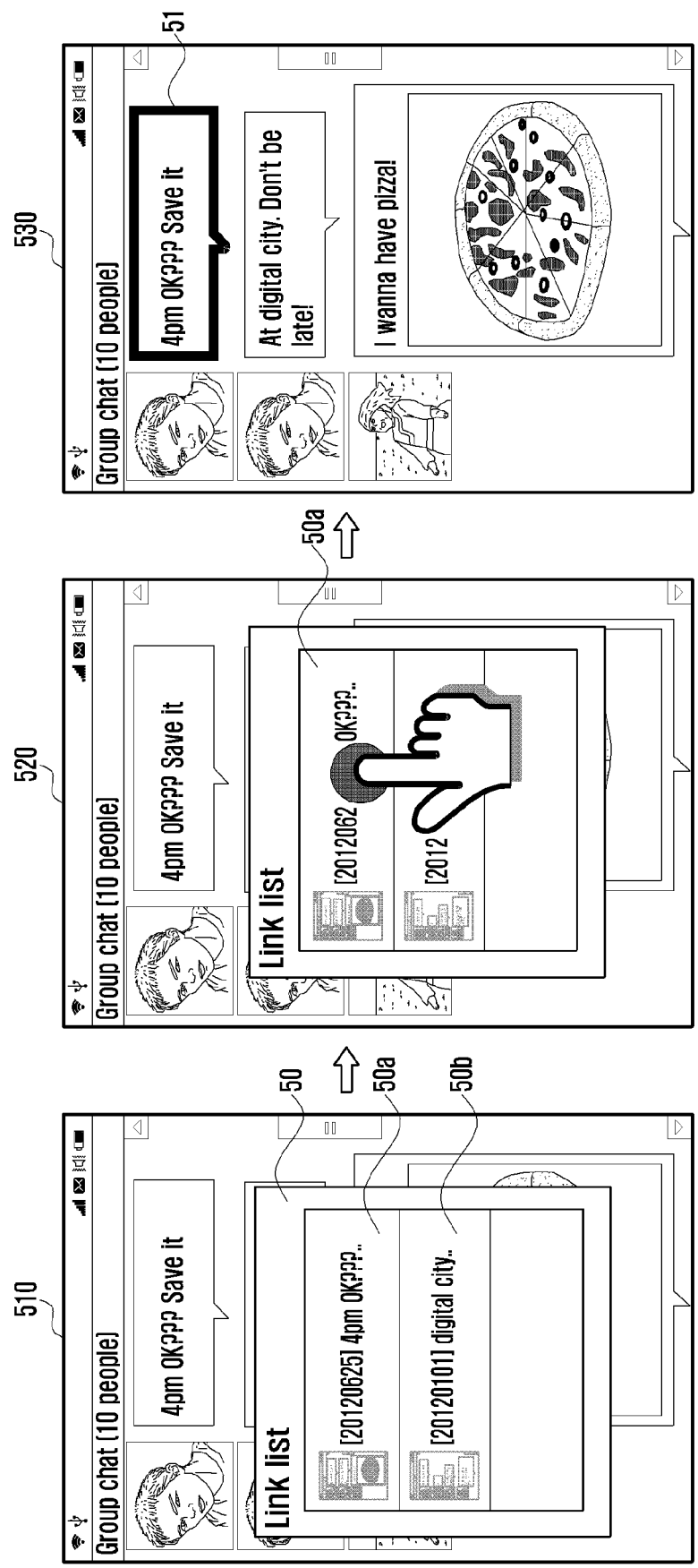
FIG. 5 is a screen diagram illustrating the method of executing a generated link query in accordance with an aspect of this disclosure.

FIG. 4 is a flowchart illustrating a method of executing a generated link query in accordance with an aspect of this disclosure, and FIG. 5 is a screen diagram illustrating the method of executing a generated link query in accordance with an aspect of this disclosure.

Referring to FIGS. 4 and 5, the control unit 110 in accordance with an aspect of this disclosure can control the display panel 131 so that a conversation screen is displayed at operation 401. The control unit 110 can determine whether or not a link query view has been requested at operation 403. The link query view can be requested through a predetermined function key or an option menu.

If it is determined that a link query view has not been requested, the control unit 110 can perform a corresponding function at operation 405. For example, the control unit 110 can perform a conversation message transmission/reception function or the above-described link query, and/or any other suitable operation. However, if it is determined that a link query view has been requested, the control unit 110 can output a list of link queries that have been previously generated and stored (hereinafter referred to as a 'link query list') at operation 407. For example, the control unit 110 can control the display panel 131 so that the link query list is output in the form of a pop-up window (hereinafter referred to as a 'link query list window') 50 as shown in the screen 510 in FIG. 5. From the link query list window 50, it can be seen that a first link query 50a and a second link query 50b are stored in the mobile terminal 100.

Thereafter, the control unit 110 can detect that a specific link query has been selected at operation 409. For example, as shown in the screen 520 in FIG. 5, when the first link query 50a is touched, the control unit 110 can recognize that the first link query 50a has been selected.

When the selection of a specific link query is detected in the link query list window 50, the control unit 110 can search for a conversation message corresponding to the selected specific link query at operation 411. In some aspects, the search may be considered successful, if the conversation message corresponding to the selected specific link query is identified as a result of the search. Additionally or alternatively, in some aspects, if the search fails to identify the selected specific link query, the search may be considered unsuccessful.

In one example, if the ID of a conversation screen (or window) and the ID of each conversation message are present, as in an instant message, the control unit 110 can search for a conversation message corresponding to the selected link query based on the conversation session ID of the conversation screen (or window) and the conversation message ID. In another example, if IDs of a conversation screen (or window) and a conversation message are not present, as in an SMS message or a multimedia message, the control unit 110 can search for a conversation message based on information about the date when the specific conversation messages authored, one or more keywords extracted from the body of the conversation message, and the author of the conversation message.

The control unit 110 can display the retrieved conversation message 51 at operation 413. For example, as shown in a screen 530, the control unit 110 can highlight the retrieved conversation message 51 and display the highlighted conversation message 51. In another aspect, the control unit 110 can highlight the retrieved conversation message 51 in such a way that it appears to be visually different from other conversation messages. For example, when highlighting the retrieved conversation message 51, the control unit 110 can change the shape, background color, etc. of the speech bubble that corresponds to the retrieved conversation message 51. For example, if the retrieved conversation message is not present in a current screen, the control unit 110 can move the current screen. When moving the current screen, the control unit 110 can provide an animation effect indicating that the current screen is moving. By way of example, messages that are currently displayed on the screen may slide towards an edge of the display panel 131.

Although not shown in FIGS. 4 and 5, if, as a result of the search at operation 411, the conversation message corresponding to the selected link query is not present, for example, if the corresponding conversation message has been deleted by a user, the control unit 110 can check whether a captured image of the message is present or not with reference to the supplementary information region of the link query table 121. If a captured image is found to be present, the control unit 110 can control the display panel 131 to display the captured image. If, as a result of the check, no captured image is found to be present, however, the control unit 110 can search for the conversation message based on some of the other pieces of information included in the selected link query. For example, if the conversation message is not found based on the date and contents of the body included in the selected link query, the control unit 110 can search for the conversation message based on only the date or contents of the body. In another aspect, the control unit 110 can inform a user that no conversation message corresponding to a selected specific link query is present. For example, the control unit 110 can inform a user that no conversation message corresponding to a selected specific link query is present by outputting an error message or generating an error sound effect or vibration.

Additionally or alternatively, if, as a result of the search at operation 411, no conversation message corresponding to the selected link query is found to be present, the control unit 110 can perform a second search for the conversation message using only some of the pieces of information included in the selected link query. If, as a result of the second search, a conversation message is found using those pieces of information, the control unit 110 can display the retrieved conversation message. If, however, as a result of the second search, no conversation message is found, the control unit 110 can check whether a captured image mapped to the selected link query is present or not. If, as a result of the check, a captured image mapped to the selected link query is found to be present, the control unit 110 can display the mapped captured image. If, as a result of the check, however, no captured image mapped to the selected link query is found to be present, the control unit 110 can inform the user that no conversation message corresponding to the selected link query is present.

Figure 6:
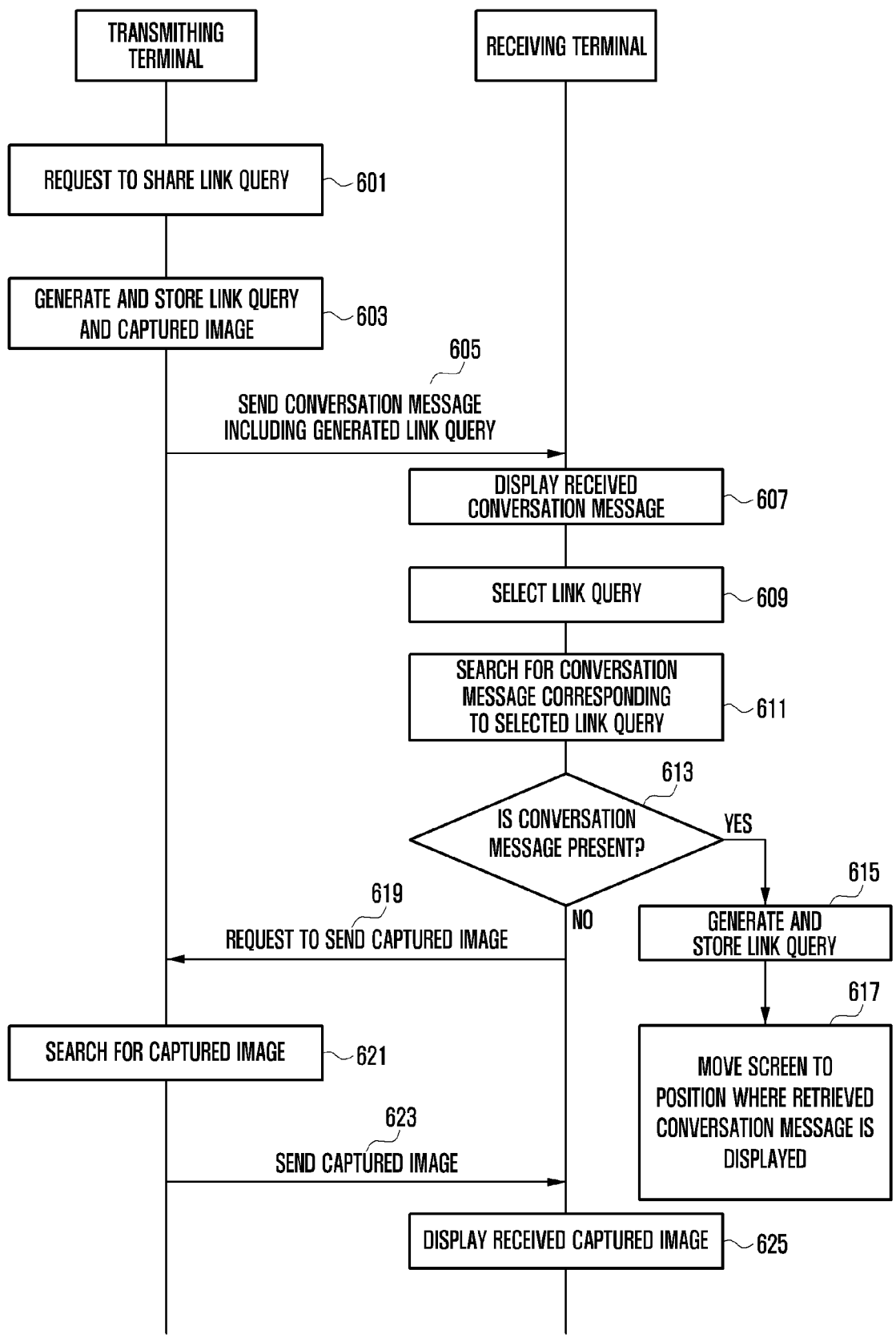
FIG. 6 is a flowchart illustrating a method of sharing a link query in accordance with an aspect of this disclosure.
Figure 7A:
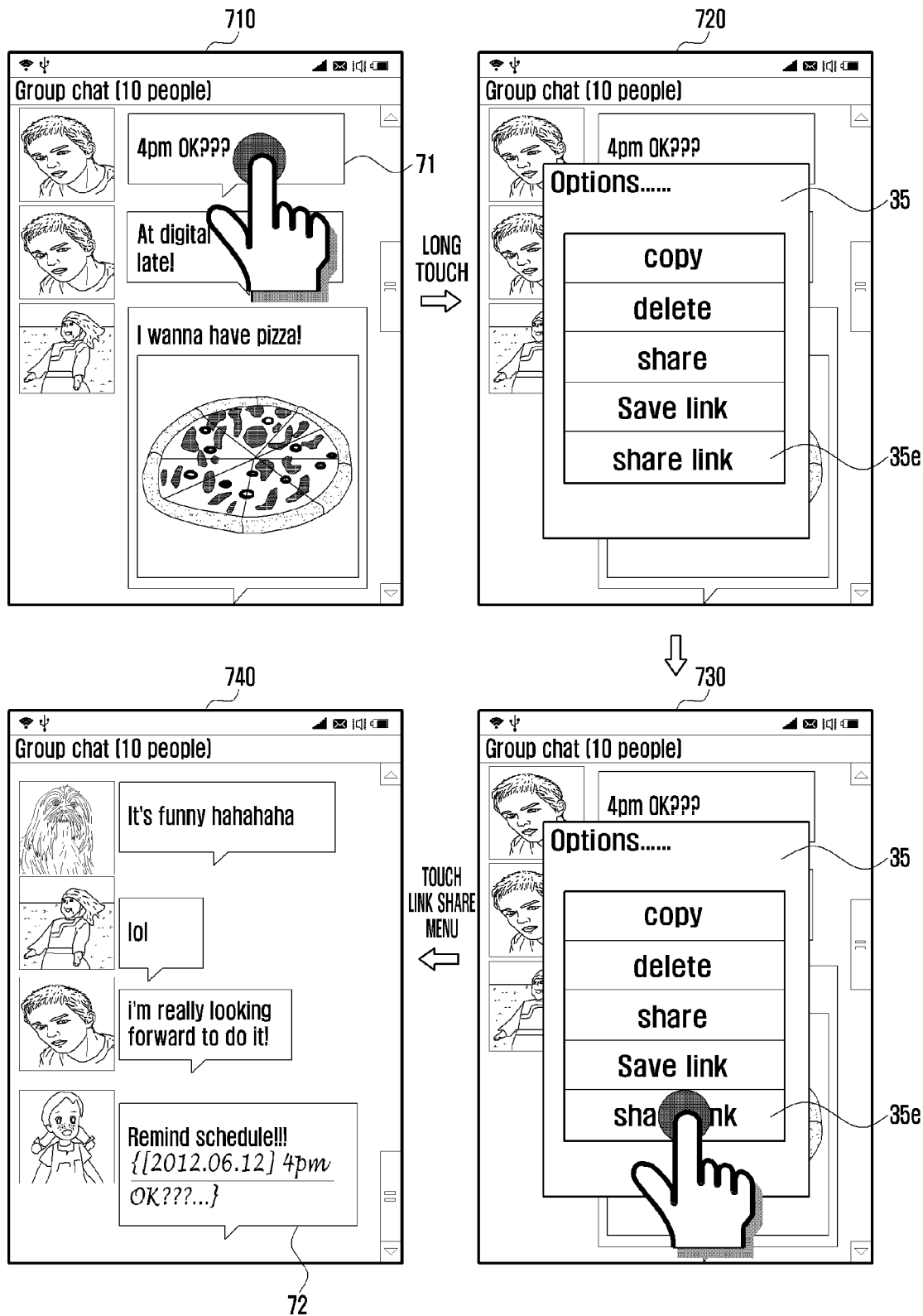
FIG. 7A and FIG. 7B are screen diagrams illustrating the method of sharing a link query in accordance with an aspect of this disclosure.
Figure 7B:
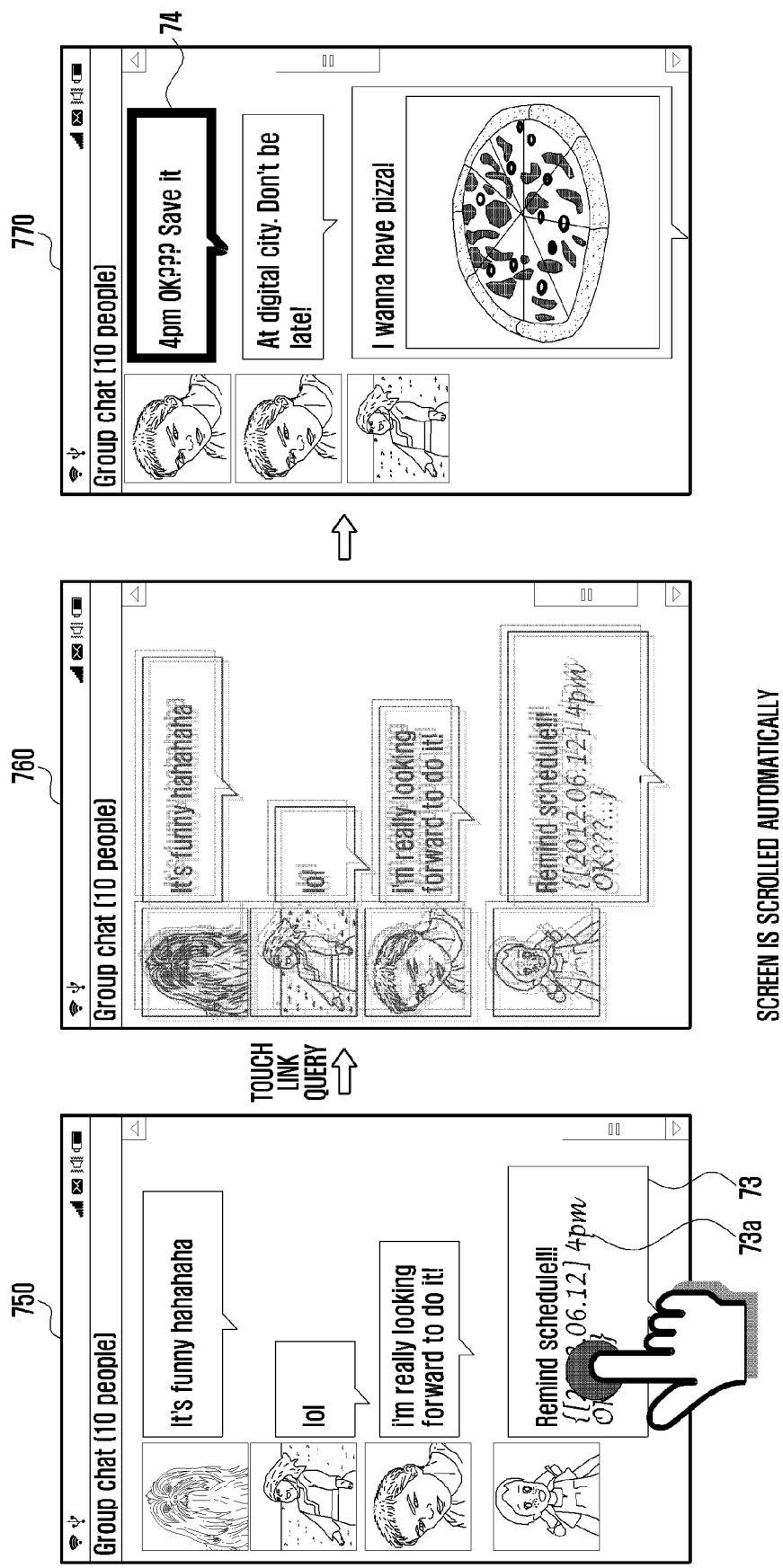

FIG. 6 is a flowchart illustrating a method of sharing a link query in accordance with an aspect of this disclosure, and FIGS. 7A and 7B are screens illustrating the method of sharing a link query in accordance with an aspect of this disclosure. A transmitting terminal and a receiving terminal are described separately below, for convenience of description. It is however to be noted that the mobile terminal 100 can operate as a transmitting terminal or a receiving terminal according to the circumstances.

Referring to FIGS. 6 to 7B, the transmitting terminal in accordance with an aspect of this disclosure can detect a link query share request at operation 601. The link query share request can be generated in a conversation screen. For example, as shown in the screen 710 in FIG. 7A, when a long touch on a specific conversation message 71, from among the conversation messages included in a conversation screen, is detected, the transmitting terminal can display a menu pop-up window 35 as shown in a screen 720. Thereafter, when a touch on the link share menu 35e is generated in the menu pop-up window 35, as shown in a screen 730, the transmitting terminal can recognize that a link query share request has been generated.

When the link query share request is detected, the transmitting terminal can generate a link query corresponding to the conversation message 71 and a captured image of the conversation message 71 and store the generated link query and captured image at operation 603. Thereafter, the transmitting terminal can send a conversation message including the generated link query (hereinafter referred to as a 'link message') to the receiving terminal at operation 605. Here, the transmitting terminal can include a link query in the body of the link message and add an extension type, indicating that the link message includes the link query, to the header of the link message. In another aspect, the transmitting terminal may add specific Unicode symbol to the link message in order to indicate that the link message includes the link query.

After sending the link message, the transmitting terminal can display a conversation message 72, including the link query, at the bottom of the conversation screen (or window), as shown in the screen 740. In order to indicate that the conversation message 72 includes the link query, the transmitting terminal can highlight the conversation message 72. For example, the transmitting terminal may display the conversation message 72 in a different letter color, a different letter size, and different letter attributes (e.g., in bold, in italics, or underlined).

The receiving terminal can display the conversation message (i.e., link message) received from the transmitting terminal at operation 607. In particular, the receiving terminal can check whether or not the received conversation message includes a link query by parsing the conversation message. For example, the receiving terminal can check whether or not an extension type is included in the header of the conversation message or whether or not specific Unicode is included in text of the conversation message. If, as a result of the check, a link query is found to be included in the received conversation message, the receiving terminal can display a conversation message 73, including a link query 73a, at the bottom of a conversation screen using a speech bubble, as shown in the screen 750. Here, the receiving terminal can highlight the link query in such a way that it appears visually different from other common conversation messages. For example, the receiving terminal can display the size, color, attributes, etc. of letters indicating the link query so that the link query is different from other common conversation messages.

The receiving terminal can detect that the link query 73a has been selected at operation 609. When the selection of the link query 73a is detected, the receiving terminal can search for a conversation message corresponding to the selected link query at operation 611 and check whether a conversation message is present or not at operation 613. In some aspects, the search may be considered successful, if the conversation message corresponding to the selected link query is identified as a result of the search. Additionally or alternatively, in some aspects, if the search fails to identify the selected query, the search may be considered unsuccessful. If, as a result of the check at operation 613, a conversation message corresponding to the selected link query is found to be present (e.g., if the search is successful), the receiving terminal can proceed to operation 615, at which the receiving terminal generates a link query corresponding to the retrieved conversation message and stores the generated link query. In this case, the user of the receiving terminal can easily identify a conversation message corresponding to a link query.

The receiving terminal can move the conversation screen to the position where the retrieved conversation message is displayed at operation 617. For example, when a touch on the link query 73a is generated as shown in a screen 750, the receiving terminal can search for a conversation message corresponding to the link query 73a and move the conversation screen in order to display a retrieved conversation message 74, as shown in a screen 760. For example, the receiving terminal may scroll up or scroll down the conversation screen until the conversation message 74 is displayed. In some instances, the conversation screen may be scrolled in much the same way as when the screen's scroll bar is actuated. Thus, when the screen scrolled, a visual effect is presented in which one or more messages that are currently displayed on the screen are moved towards the edge of the screen in order to free up space for the message 74. The movement of the message is triggered without a scroll bar being actuated. Thereafter, when the retrieved conversation message 74 is placed at the top of a conversation screen, as shown in the screen 770, the receiving terminal can stop the moving of the conversation screen. Here, the receiving terminal can highlight the retrieved conversation message 74 in such a way as to be visually different from other conversation messages, and display the highlighted conversation message 74.

If, as a result of the check at operation 613, however, no conversation message corresponding to the selected link query is found to be present, the receiving terminal can proceed to operation 619, in which the receiving terminal requests the transmitting terminal to send the captured image. In response to the request, the transmitting terminal can search for the captured image at operation 621 and send the retrieved captured image to the receiving terminal at operation 623. The receiving terminal can display the received captured image at operation 625.

Meanwhile, the receiving terminal has been illustrated as generating and storing a link query corresponding to a retrieved conversation message at operation 615 of FIG. 6, but this disclosure is not limited thereto. For example, the receiving terminal may store a link query received from the transmitting terminal without additionally generating the link query. In this case, operation 615 may be omitted.

In the above example, the receiving terminal has been illustrated as immediately requesting the transmitting terminal to send a captured image if no conversation message corresponding to a link query is present in FIG. 6, but this disclosure is not limited thereto. For example, if no conversation message corresponding to a link query is present, a receiving terminal in accordance with another aspect of this disclosure can display a pop-up window for querying the user as to whether the a captured image of the conversation message corresponding to the link query is to be requested. In such instances, the receiving terminal may send to the transmitting terminal a request for the captured image only when the user requests transmission of the captured image.

Moreover, in the above example, the captured image has been described as being generated and stored when a link query is generated in FIG. 6, but this disclosure is not limited thereto. For example, the transmitting terminal in accordance with another aspect of this disclosure may generate a captured image when the receiving terminal requests transmission of the captured image, and may transmit the generated captured image to the receiving terminal. Furthermore, an example in which the number of receiving terminals is one has been illustrated with reference to FIG. 6. However, a link query may be transmitted to a plurality of receiving terminals.

Furthermore, the receiving terminal has been illustrated as requesting the transmitting terminal to send a captured image at operation 619. However, the receiving terminal may check information about the person who generated the link query and request the person who generated the link query to send the captured image.

Figure 8:
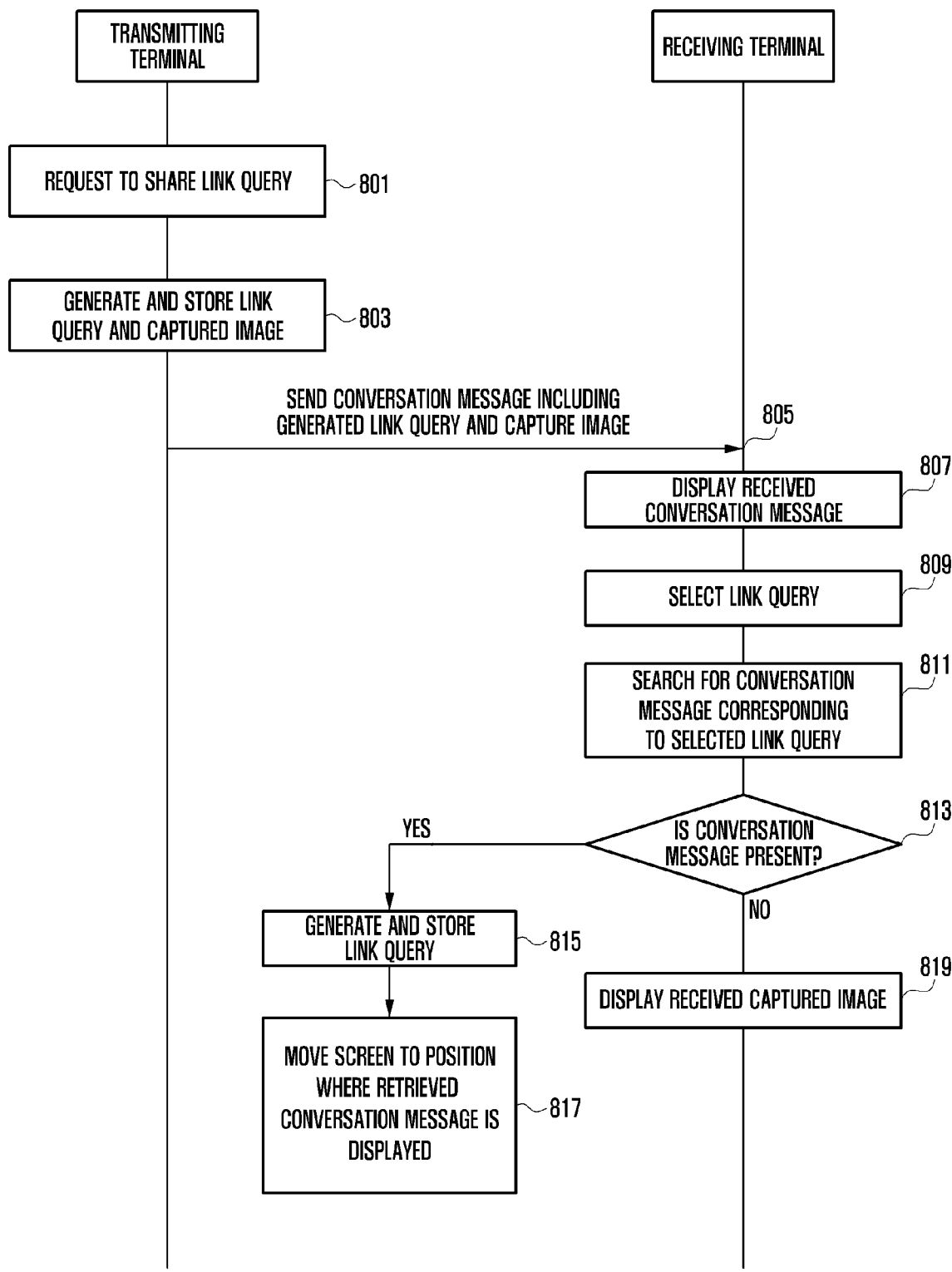
FIG. 8 is a flowchart illustrating a method of sharing a link query in accordance with another aspect of this disclosure.

FIG. 8 is a flowchart illustrating a method of sharing a link query in accordance with another aspect of this disclosure.

Referring to FIG. 8, a transmitting terminal in accordance with another aspect of this disclosure can detect a link query share request at operation 801. The link query share request can be generated in a conversation screen. For example, when a long touch on a specific conversation message included in the conversation screen is detected, the transmitting terminal can output the menu pop-up window 35. Thereafter, when a touch on the link share menu 35e is generated in the menu pop-up window 35, the transmitting terminal can recognize that a link query share request has been generated.

When the link query share request is detected, the transmitting terminal can generate a link query and a captured image and store the generated link query and captured image at operation 803. Thereafter, the transmitting terminal can send a conversation message that includes the generated link query and captured image to the receiving terminal at operation 805.

The receiving terminal can display the conversation message received from the transmitting terminal at operation 807. In particular, the receiving terminal can parse the received conversation message and display the conversation message including the link query. The receiving terminal can detect that the link query has been selected at operation 809. When the selection of the link query is detected, the receiving terminal can search for a conversation message corresponding to the selected link query at operation 811 and check whether the conversation message is present at operation 813. In some aspects, the search may be considered successful, if the conversation message corresponding to the selected specific link query is identified as a result of the search. Additionally or alternatively, in some aspects, if the search fails to identify the selected specific link query, the search may be considered unsuccessful.

If, as a result of the check at operation 813, a conversation message corresponding to the selected link query is found to be present, the receiving terminal can proceed to operation 815, in which the receiving terminal generates a link query corresponding to the retrieved conversation message and stores the generated link query. The receiving terminal can move a conversation screen to the position where the retrieved conversation message is displayed at operation 817. Here, the receiving terminal can highlight the retrieved conversation message 74 and display the highlighted conversation message 74. As noted above, the highlighting can include displaying the message in a different letter color, font size, or in any other way that is capable of visually distinguishing the message from other messages that are displayed.

If, as a result of the check at operation 813, however, no conversation message corresponding to the selected link query is found to be present, the receiving terminal can proceed to operation 819, in which the receiving terminal displays a received captured image.

The receiving terminal has been illustrated as generating and storing the link query corresponding to the retrieved conversation message at operation 815 of FIG. 8, but this disclosure is not limited thereto. For example, the receiving terminal may store the link query and the captured image received from the transmitting terminal at operation 805. In this case, operation 815 may be omitted.

As described above, in the method and apparatus for managing conversation messages in a mobile terminal in accordance with an aspect of this disclosure, a link query for performing a shortcut function on a specific conversation message, from among a plurality of conversation messages, can be generated and stored. A user can easily search for a specific conversation message through the link query. For example, in accordance with an aspect of this disclosure, a user can generate a link query corresponding to a message including an appointment date, time, and place (hereinafter referred to as an 'appointment message'), from among a plurality of conversation messages, and store the generated link query. Thereafter, if the appointment date is not remembered, the user can easily check the appointment message using the link query without manually searching a conversation screen for the appointment message, as in the prior art.

Furthermore, in this disclosure, the link query can be shared with conversation partners. Thus, in accordance with this disclosure, the conversation partners can be easily reminded of a specific conversation message from among a plurality of previous conversation messages. For example, if it is desired to remind conversation partners of a specific conversation message within previous conversation contents, a user in accordance with this disclosure can send a link query corresponding to the specific conversation message or some of the link query. Accordingly, the conversation partners who receive the link query or a portion of the link query can easily check the specific conversation message without a need to manually search a conversation screen for the specific conversation message.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

The method and apparatus for managing conversation messages in a mobile terminal in accordance with some aspects of this disclosure have been described above through the specification and drawings. Although specific terms are used, the terms are merely used according to their common meanings in order to easily describe the technical contents of this disclosure and help understanding of this disclosure, and this disclosure is not limited to the aforementioned aspects of this disclosure. That is, it will be evident to those skilled in the art that various aspects based on the technical spirit of this disclosure can be implemented.

What is claimed is:

1. A method for managing messages comprising:
   displaying, by a first terminal, a conversation screen associated with a plurality of messages;
   displaying an indication that there is a link query corresponding to a first message;
   detecting whether the indication is selected;
   responsive to the indication being selected, performing a first search of the plurality of messages for the first message, the first search being performed based on a first search key that is generated using the link query;
   displaying the first message when the first search is successful;
   when the first search is unsuccessful, detecting whether a captured image mapped to the link query is available, wherein the captured image is a captured image of the first message; and
   displaying the captured image when the captured image is available.

2. The method of claim 1, wherein displaying the first message comprises highlighting the first message.

3. The method of claim 1, wherein displaying the first message comprises scrolling the conversation screen until the first message becomes visible, the scrolling including animating one or more messages that are currently displayed on a screen of the first terminal.

4. The method of claim 1, further comprising at least one of:
   outputting an indication that the first message is not available when the first search is unsuccessful; and
   performing a second search of the plurality of messages for the first message, the second search being performed based on a second search key that is generated using the link query, the second search being performed when the first search is unsuccessful.

5. The method of claim 1, further comprising:
   when the first search is unsuccessful, performing a second search of the plurality of messages for the first message, the second search being performed based on a second search key that is generated using the link query;
   when the second search is successful, displaying the first message;
   when the second search is unsuccessful, detecting whether a captured image mapped to the link query is available; and
   when the captured image is available, displaying the captured image.

6. The method of claim 1, further comprising:
   detecting a request to generate the link query; and
   generating and storing, by the first terminal, the link query in response to the request,
   wherein the link query is generated based on at least one of a date when the first message is authored, contents of a body of the first message, an author of the first message, a conversation session ID of the conversation that includes the first message, a message ID of the first message, a captured image of the first message, and information about a person who requested the generation of the link query.

7. The method of claim 1, further comprising:
   detecting a request to identify the first message to a second terminal;
   in response to the request, generating the link query and generating a captured image of the first message; and
   sending the link query to the second terminal, wherein the link query is sent in a body of a second message, the second message having the same format as the first message.

8. The method of claim 7, further comprising:
displaying, by the second terminal, an indication that there is the link query;
performing, by the second terminal, a third search for the first message when the displayed indication is selected, the search being performed based on a search key that is generated using the link query; and
displaying, by the second terminal, the first message when the search is successful.

9. The method of claim 8, further comprising:
when the third search is unsuccessful, transmitting a request for the captured image, the request being transmitted from the second terminal to the first terminal; and
displaying, by the second terminal, the captured image when the captured image is received from the first terminal.

10. The method of claim 1, further comprising:
detecting a request to identify the first message to a second terminal;
generating the link query and capturing an image of the first message, in response to the request; and
sending the link query and the captured image to the second terminals,
wherein the link query and the captured image are sent in a body of a second message, the second message having the same format as the first message.

11. An apparatus comprising:
a display screen; and
a processing circuitry configured to:
display, on the display screen, a conversation screen associated with a plurality of messages;
display, on the display screen, an indication that there is a link query corresponding to a first message;
detect whether the indication is selected;
responsive to the indication being selected, perform a first search of the plurality of messages for the first message, the first search being performed based on a first search key that is generated using the link query;
display, on the display screen, the first message when the first search is successful;
when the first search is unsuccessful, detect whether a captured image mapped to the link query is available, wherein the captured image is a captured image of the first message; and
display the captured image when the captured image is available.

12. The apparatus of claim 11, wherein displaying the first message comprises highlighting the first message.

13. The apparatus of claim 11, wherein displaying the first message comprises scrolling the conversation screen until the first message becomes visible, the scrolling including animating one or more messages that are currently displayed on the display screen.

14. The apparatus of claim 11, wherein the processing circuitry is further configured to:
output an indication that the first message is not available when the first search is unsuccessful; and
perform a second search of the plurality of messages for the first message, the second search being performed based on a second search key that is generated using the link query, the second search being performed when the first search is unsuccessful.

15. The apparatus of claim 11, wherein the processing circuitry is further configured to:
when the first search is unsuccessful, perform a second search of the plurality of messages for the first message, the second search being performed based on a second search key that is generated using the link query;
when the second search is successful, display, on the display screen, the first message;
when the second search is unsuccessful, detect whether a captured image mapped to the link query is available; and
when the captured image is available, display the captured image.

16. The apparatus of claim 11, wherein the processing circuitry is further configured to:
detect a request to generate the link query; and
generate and store the link query in response to the request,
wherein the link query is generated based on at least one of a date when the first message is authored, contents of a body of the first message, an author of the first message, a conversation session ID of the conversation that includes the first message, a message ID of the first message, a captured image of the first message, and information about a person who requested the generation of the link query.

17. The apparatus of claim 11, wherein the processing circuitry is further configured to:
detect a request to identify the first message to a second terminal;
in response to the request, generate the link query and generate a captured image of the first message; and
send the link query to the second terminal;
wherein the link query is sent in a body of a second message, the second message having the same format as the first message.

18. The apparatus of claim 17, wherein the processing circuitry is further configured to:
receive a request for a captured image corresponding to the first message; and
transmit the captured image to the second terminal in response to the request.

\* \* \* \* \*